United States Patent [19]

Durst et al.

[11] Patent Number: 5,022,080
[45] Date of Patent: Jun. 4, 1991

[54] ELECTRONIC NOTARY

[76] Inventors: Robert T. Durst, 83 Harwich Rd., Fairfield, Conn. 06430; Kevin D. Hunter, 440 Allwyndale Dr., Stratford, Conn. 06497

[21] Appl. No.: 509,447

[22] Filed: Apr. 16, 1990

[51] Int. Cl.[5] .................. H04K 1/00; H04K 9/00; H04L 9/00

[52] U.S. Cl. ................................ 380/23; 380/51; 340/825.34

[58] Field of Search .................. 380/23, 25, 51; 340/825.34

[56] References Cited

U.S. PATENT DOCUMENTS

| | | | |
|---|---|---|---|
| 3,890,599 | 7/1975 | Simjian | 340/149 R |
| 4,064,389 | 12/1977 | Patterson | 235/341 |
| 4,386,233 | 5/1983 | Smid et al. | 380/45 |
| 4,458,109 | 7/1984 | Mueller-Schloer | 178/22.11 |
| 4,703,485 | 10/1987 | Patel | 371/37 |
| 4,819,267 | 4/1989 | Cargile et al. | 380/23 |
| 4,853,961 | 7/1989 | Pastor | 380/21 |
| 4,885,778 | 12/1989 | Weiss | 380/23 |
| 4,904,851 | 2/1990 | Yukino | 380/24 |
| 4,934,846 | 6/1990 | Gilham | 380/23 |
| 4,944,008 | 7/1990 | Piosenka et al. | 380/23 |

Primary Examiner—Stephen C. Buczinski
Attorney, Agent, or Firm—David E. Pitchenik; Melvin J. Scolnick; Robert H. Whisker

[57] ABSTRACT

Method and apparatus for determining that a first unit of data associated with a first party has not been modified since a specified point in time. A method includes the steps of (a) providing the first unit of data and (b) generating a second unit of data from the first unit of data, the second unit of data being expressive of an information content of the first unit of data. The method further includes a step of (c) generating a time indication for specifying a point in time, the time indication being generated with time generation means having a time is settable by a second party other than the first party. That is, the time generation means is secured and cannot be altered or changed by the first party. The method further includes a step of (d) encrypting the second unit of data and the generated time indication to generate a third unit of data. The method includes as an additional step a step of (e) validating the first unit of data to ensure that the first unit of data has not been modified since the specified point in time.

24 Claims, 3 Drawing Sheets

ELECTRONIC NOTARY

FIELD OF THE INVENTION

This invention relates generally to document validation method and apparatus and, in particular, to method and apparatus for authenticating a document that is stored or transmitted in electronic form to ensure that the document has not been altered subsequent to a date and a time associated with the document.

BACKGROUND OF THE INVENTION

A conventional solution to associating a specific date with a document is to provide the document in a physical format and to notarize the document. The notarization serves to place the existence of the document in time, it being assumed that it is relatively difficult to alter the notarized document without the alteration being detectable. However, this conventional approach is generally inappropriate for use with electronically stored documents in that electronically stored documents can, by their nature, be readily altered without the alteration being detectable. For example, it is a relatively simple task to access a stored document to change numbers, dates, text and other features of the document. The information regarding the date of creation and/or last alteration of the document can also be modified easily.

As a result, one typical solution is to maintain the original physical document, or to convert an electronically stored document to a physical format, and to notarize and store the physical document. However, this is an expensive undertaking and defeats in large measure the advantages of electronically storing documents.

One proposed solution is store a copy of the document on a Write Once Read Many (WORM) type of optical disk. This solution has the advantage that the document, once written, cannot be modified. However, this solution also requires a large number of disks for any reasonably sized application. The procurement and storage of such disks is expensive and furthermore presents the problem of locating a desired document among a potentially large number of stored documents.

However, neither of the approaches of notarizatin of a physical document or storage of a document on a write only medium are totally fool proof. For example, a notarization can be forged or falsified, the deception being difficult to detect especially if only the date is falsified. Furthermore, in the write-only type of media solution a modified disk may be substituted for an original disk, thereby providing an opportunity to modify any documents so stored.

The authentication of electronically stored documents is achieving a greater significance in that it is becoming relatively common to exchange electronically stored documents between parties to a transaction. By example, using Electronic Document Interchange (EDI) many companies now exchange purchase orders, invoices and similar documents electronically. However, if a dispute arises as to what was transmitted as opposed to what was received it may be difficult to establish which version of a document is correct and/or has precedence in time. As a result, many EDI transactions having any monetary significance are normally confirmed with physical documents to provide a paper audit trail. However, reducing documents to physical form defeats in large measure the advantages of EDI.

It is known in the prior art to provide in an encrypted form certain data associated with a date and/or a time. For example, it is known to encrypt postage indicia, wherein a portion of the indicia is a date and a time. It is also known in check writing applications to provide certain information relating to the check in an encrypted form, this information typically including the date the check was issued. In the first example of an encrypted postage indicia the postal authority is enabled to decrypt the postage information to verify the validity of the postage indicia. In the second example a bank may decrypt the encrypted check information to verify the authenticity of a check presented for payment.

However, in neither of these examples is the date associated with the encrypted information a "secure date". That is, in these examples the date may be readily modified by the party accomplishing the original encryption. As such, although there may be a presumption that the encrypted date is the date that the postage indicia was created or the check was issued, there is no effective method to verify that this is true.

It is therefore an object of the invention to provide an electronic notarization apparatus and method for electronically stored or transmitted documents and other data.

It is another object of the invention to provide method and apparatus for authenticating a document or other electronically stored or transmitted data to ensure that the document has not been altered subsequent to a date and a time associated with the document.

It is a further object of the invention to provide a cryptographic method and apparatus for authenticating a document stored or transmitted in electronic format, to ensure that both the date of creation and/or last date of alteration and the contents of the document have not been altered.

SUMMARY OF THE INVENTION

The foregoing problems are overcome and the objects of the invention are realized by method and apparatus for determining that a first unit of data associated with a first party has not been modified subsequent to a specified point in time. A method includes the steps of (a) providing the first unit of data and (b) generating a second unit of data from the first unit of data, the second unit of data being expressive of an information content of the first unit of data. The first unit of data may be any data that is desired to be authenticated for determining if the data has been modified subsequent to a specified point in time. By example, the first unit of data may be an electronically stored or transmitted document, such as a purchase order, or a contract. The first unit of data may also be one or more records from a data base of records. The first unit of data may also be image data such as that obtained from a document scanner such as a facsimile device or a hand held scanner. The second unit of data may be generated from the first unit of data by a number of suitable techniques including but not limited to CRC generation, parity generation, checksum generation and by variants and combinations thereof.

The method further includes a step of (c) generating a time indication for specifying a point in time, the time indication being generated with time generation means having a time modifiable only by a party other than the first party. That is, in accordance with the invention, the time generation means is secured and the time maintained thereby cannot be altered or changed by the first party. Preferably the time indication includes both a present date and a present time, such as time expressed in GMT. The method further includes a step of (d) encrypting the second unit of data and the time indication to generate a third unit of data. The step of encrypting may be accomplished by a number of suitable techniques including but not limited to public key encryption, private key encryption and variants and combinations thereof.

The method includes an additional optional step of (e) validating the first unit of data to ensure that the first unit of data has not been modified subsequent to the specified point in time. In one embodiment of the invention the step (e) of validating includes the steps of (f) providing the third unit of data, (g) decrypting the third unit of data to generate a fourth unit of data and also the previously generated time indication therefrom, (h) providing a fifth unit of data proposed to be identical to the first unit of data, (i) generating a sixth unit of data from the fifth unit of data, and (j) comparing the fourth unit of data with the sixth unit of data to determine if they are the same.

The step (e) of validating, in another embodiment of the invention, may be accomplished by providing a fifth unit of data (f'), the fifth unit of data purported to be identical to the first unit of data. The fifth unit of data is converted to a sixth unit of data (g') by a procedure identical to that employed to create the second data unit. A time purported to be the time associated with the third data unit, such as the time of creation, is combined with the sixth data unit (h') in a predetermined manner, such as by appending the time indication to the sixth data unit. Next, the sixth unit of data, including the purported time indication, is encrypted (i') using a same procedure as that employed to generate the third data unit. The resulting data string representing the encrypted sixth data unit and purported time is compared (j') to the third data unit. A match indicates that the purported time is valid.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
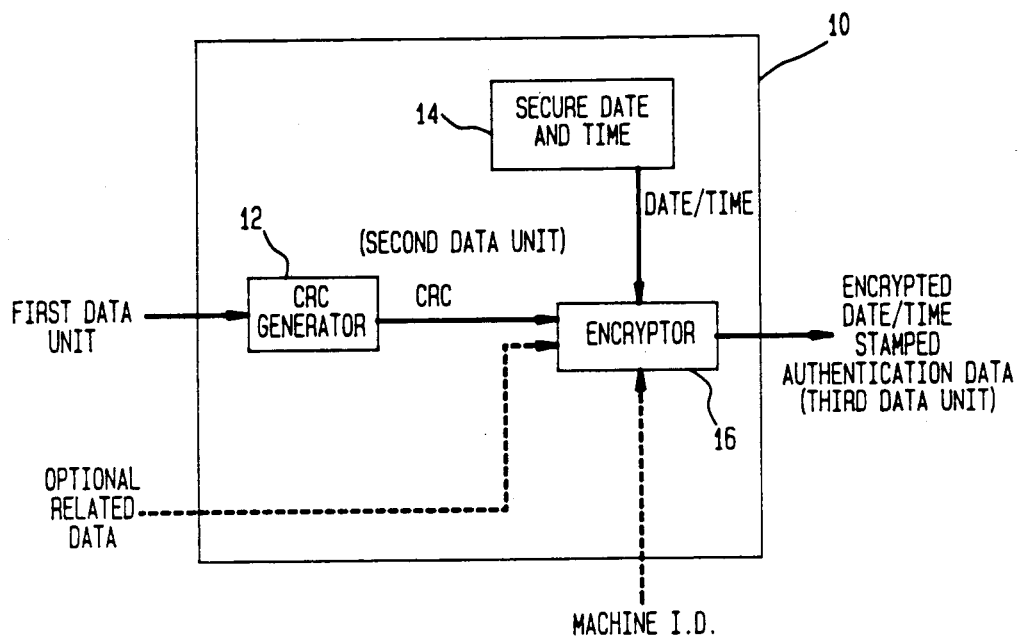
FIG. 1 is a block diagram that illustrates an embodiment of data authentication apparatus that is constructed and operated in accordance with the invention.

Referring first to FIG. 1 there is shown an electronic notary 10 including, in accordance with a presently preferred embodiment of the invention, a Cyclic Redundancy Check (CRC) generator 12. CRC generator 12 has an input coupled to document and/or other unit(s) of data provided by a first party desiring to authenticate the unit(s) of data. The data units may be provided from, by example, a communications network, from a mass storage device such as a disk, or directly from the memory of a data processing unit. Further in accordance with an aspect of the invention the input data units may be image data provided from a scanner such as that associated with a facsimile device or a hand held document scanner. In general, the invention may be employed to authenticate any type of digital data units wherein a data unit may comprise from one or more bits of data to some arbitrarily large number of data bytes or words. The output of the CRC generator 12 is CRC data that is generated by any one of a number of known types of CRC methods. One advantage of providing the input data unit to the CRC generator 12 is that the possibly large amount of input data is reduced to a relatively few bytes of CRC data, thereby providing for efficiencies in storage.

In this regard it should be noted that other than CRC generation methods can be employed such as calculating a check sum of the input data or performing one or two dimensional parity generation on the input data. By example, checksum or parity information can be generated for each line of characters associated with a document. Alternatively, such information can be generated for the entire document instead of on a line-by-line basis. In general, any suitable method may be employed that generates a second unit of data from a first unit of data wherein the second unit of data is expressive of an information content of the first unit of data.

Electronic notary 10 also includes a time generation device 14 that, in accordance with the invention, is a secured device such that the first party is unable to set, reset, or otherwise modify the time-related content thereof.

In accordance with an embodiment of the invention electronic notary 10 is provided by a second party for use by the first party. Only the second party has a capability to alter the time maintained by the time generating device 14. As a result, when the first party provides document and/or other data to the electronic notary 10 for notarization the first party is unable to modify in any way the date and time maintained internally within the electronic notary 10.

An encryption block 16 operates in accordance with any known type of encryption algorithm including, but not limited to, private key cryptography, such as DES, public key cryptography, such as RSA, or variants and combinations thereof. For example, the encryption device 16 can operate in accordance with electronic indicia algorithms such as those disclosed in a commonly assigned U.S. Pat. No. 4,853,961, issued Aug. 1, 1989 to Jose Pastor.

The CRC information and the date and time information are input to the encryption device 16 where this information is encrypted and is output from the electronic notary 10. This output data is referred to herein as an authentication string or packet. This output may be maintained by the first party and can be appended to the original document data and/or stored separately therefrom. The authentication string output from the electronic notary 10 may also be provided to the second party for storage. By example, this information can be provided electronically via a modem or other such device to a central repository of authentication string data maintained by the second party.

Other information can be also provided, if desired, to be included with the encrypted authentication string. For example, document-related data such as the title of the document, the author or authors of the document and other similar information can be provided separately from the document data and time data. Also, a "machine ID" that identifies the particular electronic notary, such as by a serial number, can also be provided to the encryption device 16 to be encrypted and included as part of the authentication string. These optional data inputs are shown as dashed input lines in the block diagram of FIG. 1.

Figure 2:
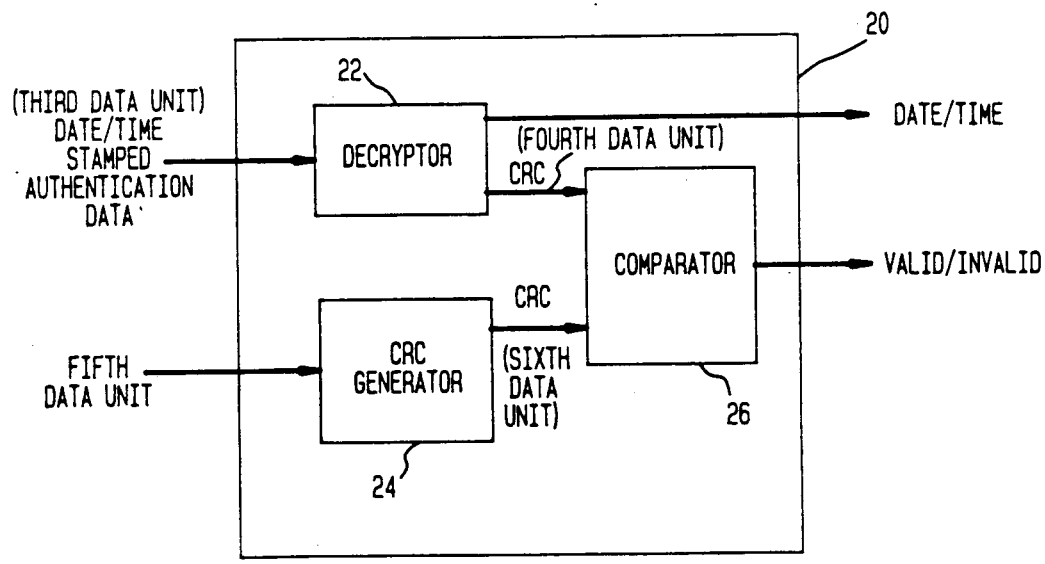
FIG. 2 is a block diagram that illustrates an embodiment of data validation apparatus that is constructed and operated in accordance with the invention.

Referring now to FIG. 2 there is shown in block diagram form a presently preferred embodiment of a validation device 20 for validating a previously electronically notarized document or data. Device 20 includes a decryption block 22 wherein the data/time stamped authentication string is provided. This block of data is that which was generated previously by the electronic notary 10 of FIG. 1. Device 20 further includes a CRC generator 24 that operates in accordance with the same CRC algorithm as the CRC generator 12 of FIG. 1. The data to be validated is provided to this second CRC generator 24. In operation, the decryption device 22 decrypts in accordance with the key associated with the first party the input data to provide therefrom the date/time information and the CRC information. The decrypted CRC information from block 22 is compared by a comparator 26 to the CRC information generated by CRC generator 24. If the two CRCs are found to be identical it is indicated that the document data provided is identical to that previously provided to the electronic notary 10 of FIG. 1. Furthermore, the date and time information retrieved from the authentication string is the date and time that this data was applied to the electronic notary 10. As a result, the decrypting party determines that the data presented for validation produces the same CRC data as the original data in addition to determining a date and time previously associated with the original data.

Of course, if the authentication string data is originally generated by a checksum, parity generation or other procedure block 24 implements the same procedure. In this case the comparator 26 compares the checksums or parity bits to determine if a match occurs.

Although it is theoretically possible that the first party may break the encryption algorithm and forge an authentication string for a particular document, the second party service may, as previously mentioned, have a permanent record of each authentication string issued by the notary 10. Thereafter, to successfully pass a verification test, the authentication string must not only generate a match between the proposed original document and the document presented for validation but the authentication string must also exist in storage within the second party's repository of authentication strings.

In such a two party system the authentication string can also be transmitted along with the electronic document. This permits the recipient to confirm that the document is valid and unmodified from the time it was originally electronically notarized. Furthermore, if the authentication string is constructed in such a manner that it is unique to an originator, such as by having a unique encryption key, the recipient of the electronic document can demonstrate that the document has not been modified and also that the document was indeed created by the sender. That is, the authentication string was encrypted with a key known to be associated with the sender.

Figure 3:
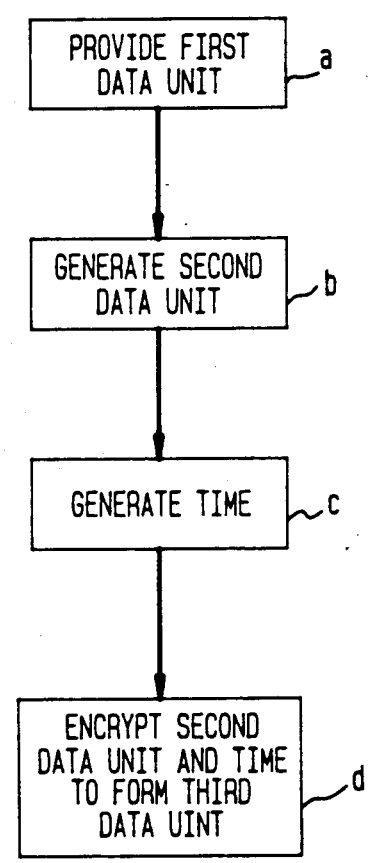
FIG. 3 is a flow chart that illustrates steps of document authentication performed in accordance with the invention.

Referring to FIG. 3 there is shown in flowchart form a method of the invention. In block (a) there is provided a first data unit. In block (b) there is generated a second data unit from the first data unit. The second data unit may be generated by CRC or other techniques as described above. Next, at block (c) information is generated with a secure time generation device, the information being expressive typically of both a time and a date. Preferably the time is expressed in Greenwich Mean Time (GMT) and reflects the actual time of day. The time may be generated to any desired accuracy such as to a second or tenths or hundredths of a second. At block (d) the generated time and the second data unit are encrypted to provide an authentication string as shown in FIG. 1. This authentication string is thereafter stored for subsequent retrieval and validation as required.

Figure 4A:
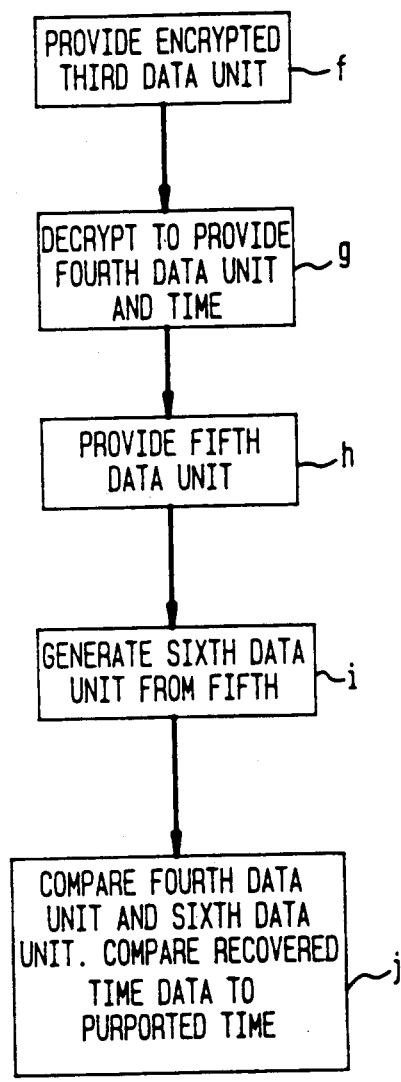
FIG. 4a is a flow chart that illustrates steps of document validation performed in accordance with one embodiment of the invention.

Referring to FIG. 4a there is shown a method, in accordance with one embodiment of the invention, for validating a previously electronically notarized data unit. At block (f) there is provided the encrypted second data unit including the time, that is, the previously generated authentication string. This authentication string is decrypted to provide a fourth data unit and the time associated with the second data unit. At block (h) there is provided a fifth data unit that is proportioned to be identical to the first data unit. At block (i) a sixth data unit is generated by the method used previously when generating the authentication string. At block (j) the fourth data unit and the sixth data unit are compared, such as by comparing the two CRCs, to determine if the CRC of the data unit to be validated matches that previously presented.

Figure 4B:
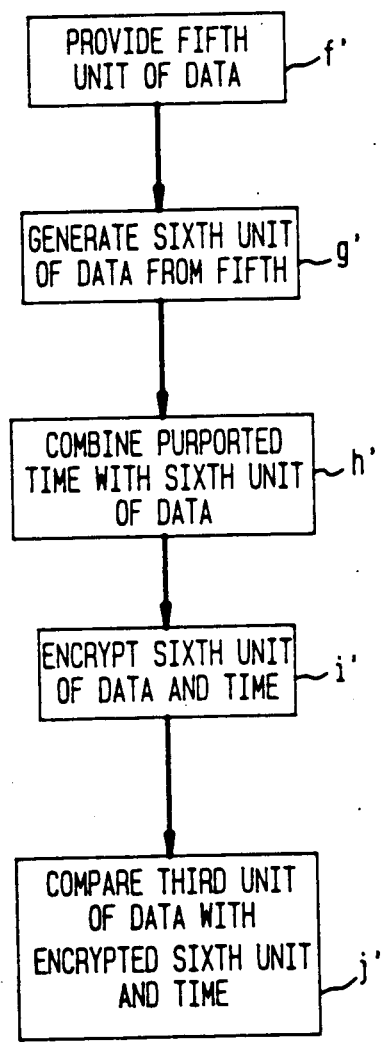
FIG. 4b is a flow chart that illustrates steps of document validation performed in accordance with another embodiment of the invention.

Referring to FIG. 4b there is shown a method, in accordance with another embodiment of the invention, for validating a previously electronically notarized data unit. At block (f') a fifth unit of data is provided, the fifth unit of data purported to be identical to the first unit of data. At block (g') the fifth unit of data is converted to a sixth unit of data by a procedure identical to that employed to create the second data unit. At block (h') a time purported to be the time associated with the third data unit, such as the time of creation, is combined with the sixth data unit in a predetermined manner, such as by appending the time indication to the sixth data unit. Next, at block (i'), the sixth unit of data, including the purported time indication, is encrypted using a same procedure as that employed to generate the third data unit. Next, at block (j') the data string representing the encrypted sixth data unit and the purported time is compared to the third data unit. A match indicates that the purported time is valid.

The invention may be embodied in hardware constructed with, for example, commercially available CRC generators, time and date maintaining "calendar/clock" integrated circuits and encryption and decryption integrated circuits. Alternatively, the invention can be embodied solely in software executed on a data processing system. Alternatively, the invention can be embodied in a combination of hardware and software. In any of the possible embodiments of the invention it is however a requirement that the system date and time be secure from tampering and/or modification by the party that employs the apparatus and method of the invention to electronically notarize document or other data. Securing the time function can be achieved by a number of techniques including physically securing a calendar/clock electronic device within a tamper proof module having no external programming inputs. Securing the time function can also be achieved by requiring the use of passwords to obtain access to a date and time function maintained by software. Securing the time function can also be achieved by storing an encrypted clock value which can only be decrypted with a third party key.

Although the use of the invention has been thus far primarily depicted in the context of electronically stored document data it should be apparent that the data may originate from a number of possible sources. For example, a particular data unit may be single record from a database. By example, in a database that maintains information concerning employees of a corporation each data base record may relate to one employee. Each time that an employee's record is accessed and modified, such as to reflect an increase in salary, the modified record is applied to the electronic notary of FIG. 1 to provide an authentication string therefor. As a result, it can be readily detected if an employee's record has been inadvertently or intentionally modified at a time subsequent to the time that the record was believed to have been last modified. This teaching may also be employed to detect unauthorized modification to a computer file such as that caused by a "viral infection".

The source of data may also be image data or the like. For example, a document or a graphics image may be converted to electronic form and the image data "notarized" to associate a time and date therewith.

Thus, it can be realized that the teaching of the invention is applicable to the authentication of a large number of different types of data originating from a wide variety of sources. It should also be realized that certain steps of the method of the invention may be performed in other than the order illustrated while still achieving the same result. As such, although the invention has been particularly shown and described with respect to preferred embodiments thereof, it will be understood by those skilled in the art that changes in form and details may be made therein without departing from the scope and spirit of the invention.

What is claimed is:

1. A method of determining that a first unit of data associated with a first party has not been modified subsequent to a specified point in time, comprising the steps of:
   providing the first unit of data;
   generating a distinct second unit of data as a function of the first unit of data, the second unit of data being solely determined by an information content of the first unit of data;
   generating a first time indication for specifying a point in time, the first time indication being generated with time generation means having a time indication that cannot be changed by the first party; and
   encrypting the second unit of data and the generated first time indication to generate a third unit of data.

2. A method as set forth in claim 1 wherein the second unit of data is generated in accordance with a CRC generation procedure.

3. A method as set forth in claim 1 wherein the second unit of data is generated in accordance with a parity generation procedure.

4. A method as set forth in claim 1 wherein the second unit of data is generated in accordance with a checksum generation procedure.

5. A method as set forth in claim 1 wherein the step of generating a first time indication generates a present date and a present time.

6. A method as set forth in claim 5 wherein the present time is expressed in Greenwich Mean Time.

7. A method as set forth in claim 1 wherein the step of providing the first unit of data includes a step of providing one or more selected records from a data base.

8. A method as set forth in claim 1 wherein the step of providing the first unit of data includes a step of providing data expressive of an image.

9. A method as set forth in claim 1 wherein the step of providing the first unit of data includes a step of providing data expressive of a document.

10. A method as set forth in claim 1 wherein the step of encrypting is accomplished in accordance with an encryption procedure selected from the group consisting of public key encryption, private key encryption and variants and combinations thereof.

11. A method as set forth in claim 1 and further including a step of validating the first unit of data, the step of validating including the steps of :
    providing a purported third unit of data;
    decrypting the purported third unit of data to generate a fourth unit of data and also the previously generated first time indication therefrom;
    providing a fifth unit of data purported to be identical to the first unit of data;
    generating a sixth unit of data from the fifth unit of data, the sixth unit of data being generated by a method identical to that employed to generate the second unit of data; and
    comparing the fourth unit of data with the sixth unit of data to determine if they are the same.

12. A method as set forth in claim 1 and including a step of storing the third unit of data with storage means associated with a party other than the first party.

13. A method as set forth in claim 1 and further including a step of validating the first unit of data, the step of validating including the steps of:
    providing a fifth unit of data purported to be identical to the first unit of data;
    generating a sixth unit of data from the fifth unit of data, the sixth unit of data being generated by a method identical to that employed to generate the second unit of data;
    associating a second time indication with the sixth unit of data, the associated second time indication purported to be identical to the first time indication;
    encrypting the sixth unit of data, including the second time indication; and
    comparing the third data unit with the encrypted sixth unit of data to determine if they are the same.

14. Apparatus for determining that a first unit of data associated with a first party has not been modified since a specified point in time, comprising:
    means for providing the first unit of data;
    means for generating a distinct second unit of data as a function of the first unit of data, the second unit of data being solely determined by an information content of the first unit of data;
    means for generating a first time indication for specifying a point in time, the time generation means having a time modifiable only by a party other than the first party; and means for encrypting the second unit of data and the generated time indication to generate a third unit of data.

15. Apparatus as set forth in claim 14 wherein the second unit of data generating means generates the second unit of data in accordance with a procedure selected from the group consisting of a CRC generation procedure, a parity generation procedure, a checksum generation procedure and variants and combinations thereof.

16. Apparatus as set forth in claim 14 wherein the the time generating means generates a current date and a current time.

17. Apparatus as set forth in claim 16 wherein the current time is expressed in Greenwich Mean Time.

18. Apparatus as set forth in claim 14 wherein the means for providing the first unit of data provides one or more selected records from a data base.

19. Apparatus as set forth in claim 14 wherein the means for providing the first unit of data provides image data.

20. Apparatus as set forth in claim 14 wherein the means for providing the first unit of data includes scanner means for scanning a surface and generating a digital representation thereof, the first unit of data being comprised of the digital representation of the surface.

21. Apparatus as set forth in claim 14 wherein the means for providing the first unit of data provides document data.

22. Apparatus as set forth in claim 14 wherein the encrypting means comprises means selected from the group consisting of public key encryption means, private key encryption means and variants and combinations thereof.

23. Apparatus as set forth in claim 14 and further comprising means for validating the first unit of data, comprising:

means for providing a purported third unit of data;

means for decrypting the purported third unit of data to generate a fourth unit of data and also the previously generated first time indication therefrom;

means for generating a sixth unit of data from a fifth unit of data purported to be identical to the first unit of data; and means for comparing the fourth unit of data with the sixth unit of data to determine if they are the same.

24. Apparatus as set forth in claim 14 and further comprising means for validating the first unit of data, comprising:

means for providing a fifth unit of data purported to be identical to the first unit of data;

means for generating a sixth unit of data from the fifth unit of data, the sixth unit of data being generated by a method identical to that employed to generate the second unit of data;

means for associating a second time indication with the sixth unit of data, the associated second time indication purported to be identical to the first time indication;

means for encrypting the sixth unit of data, including the second time indication; and means for comparing the third data unit with the encrypted sixth unit of data to determine if they are the same.

* * * * *